May 23, 1967
J. A. CHANDLER ETAL
3,320,669
LINE CUTTER
Filed Sept. 8, 1965
2 Sheets-Sheet 1
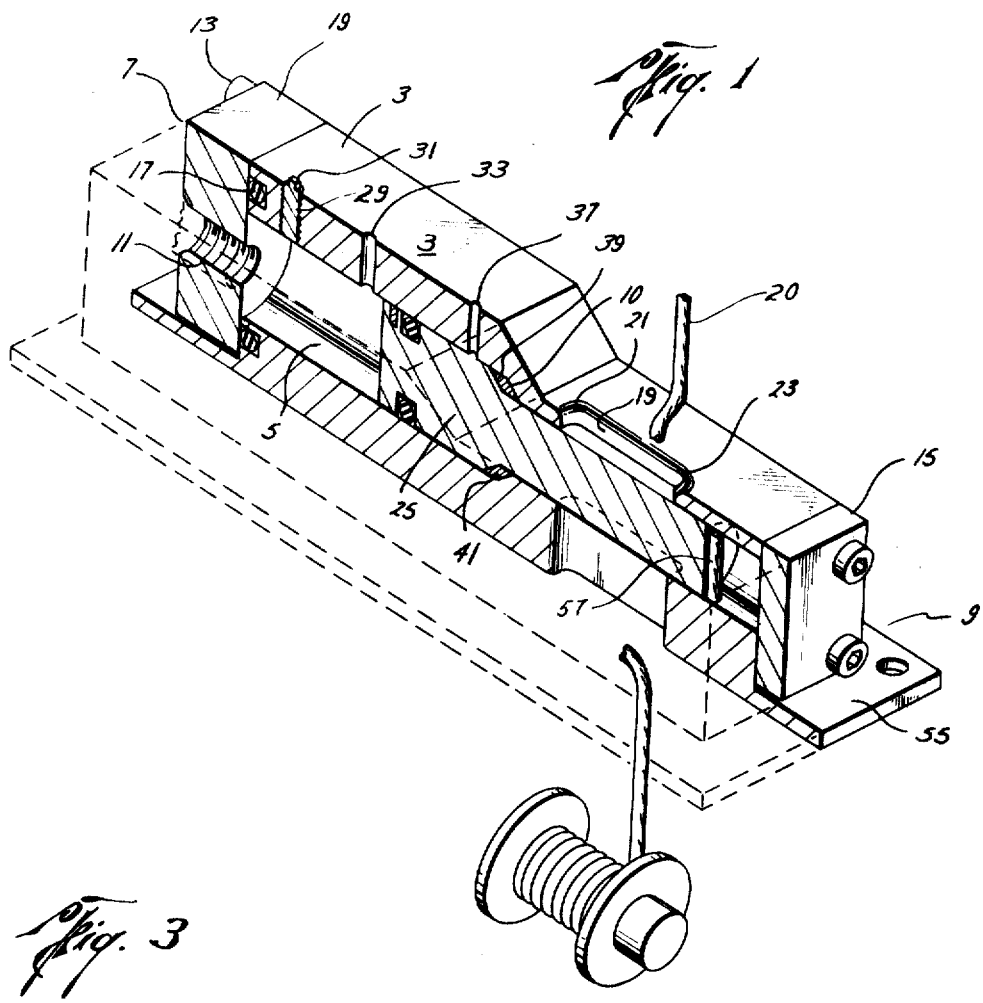
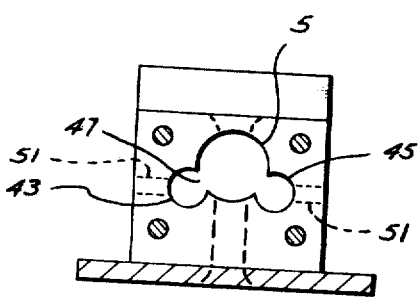
Joseph A. Chandler
Thomas M. Grubbs
INVENTORS
BY
Bernard A. Reiter
ATTORNEYS May 23, 1967  J. A. CHANDLER ETAL  3,320,669
LINE CUTTER
Filed Sept. , 1965  2 Sheets-Sheet 2
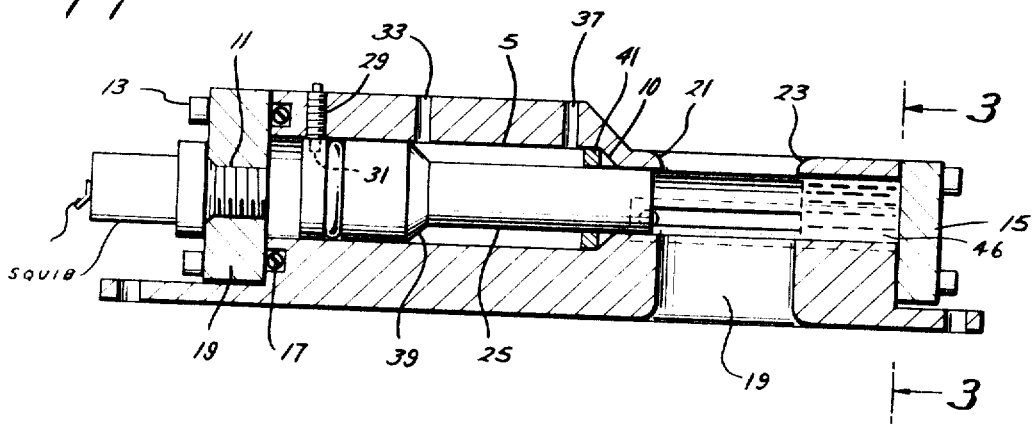
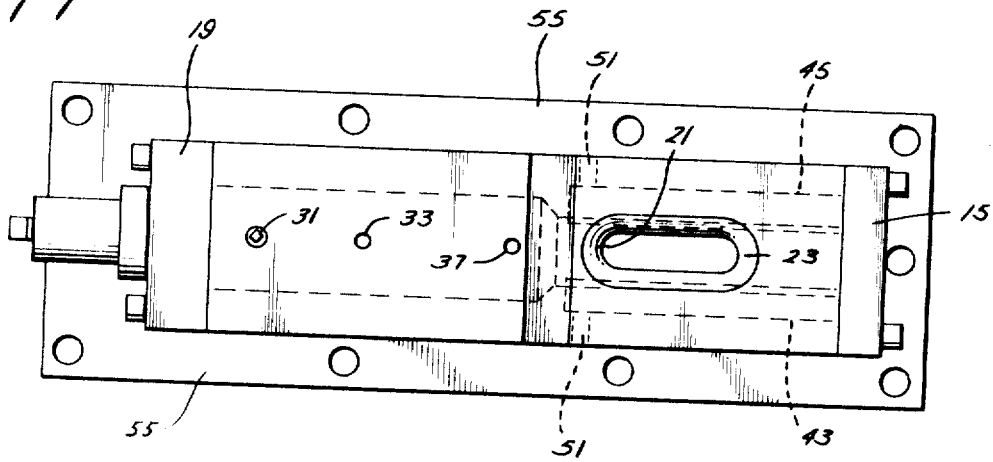
Joseph A. Chandler
Thomas M. Grubbs
INVENTORS
BY
Bernard A. Reiter
ATTORNEYS 3,320,669
LINE CUTTER
Joseph A. Chandler, Dickinson, and Thomas M. Grubbs, Houston, Tex., assignors to the United States of America as represented by the Administrator of the National Aeronautics and Space Administration
Filed Sept. 8, 1965, Ser. No. 485,960
14 Claims. (Cl. 30—228)

The invention described herein may be manufactured and used by or for the Government of the United States of America for governmental purposes without the payment of any royalties thereon or therefor.

This invention relates to cable cutting tools, and more particularly to a device for cutting control lines on parachutes or the like when the load connected thereto is likely to descend on a body of water.

In the recovery of certain types of scientific instruments, spacecraft, and other loads descending by parachute, a swift retrieval is essential in order to avoid loss or damage thereto by the elements. Due to the unpredictable nature of winds, the load will oftentimes alight on a body of water where, because of the partial inflation of the parachute, it will be driven in varying directions, thereby causing additional delay before recovery. A common expedient for precluding this delay is the use of automatic cable cutters which sever the parachute control lines from the load upon impact with the water. In the construction and attachment of these lines to a load is often required to attach them internally of the load self because of their connection to motors controlling various guide panels on the parachute. Thus the apertures in the spacecraft wall through which the lines extend become unobstructed holes when the lines are severed. Upon contact with the water, seepage into the load will result, causing damage to the electrical parts, scientific equipment, or other components therein. Various devices such as cutter means in association with a mechanical type closure for shutting out the water have been devised to preclude such results, but all are either complicated in structure or present unsatisfactory results. The instant invention is directed to a device which not only obviates the aforementioned problem, but does so with a mechanism which is simple in design and completely effective in result. It embodies a piston-in-bore type cutter in which the piston's dynamic force is utilized to both sever the cable and to pressurize a viscous grease housed in the bore end. The grease, upon impact by the piston, is forced into sealing relation around the piston adjacent the cable hole or eye, thus precluding any leakage into the load. Aside from effectively severing the cable and insulating the load from seepage, it will be seen that due to the simplicity of the structure the chances of malfunction are practically nonexistent, and the cost of construction is minimal.

These and numerous other features of the invention will become apparent to the reader upon examination of the following detailed description, claims, and drawings wherein:

FIG. 1 shows a half section perspective view of the improved cutter of the invention;

FIG. 2 shows a sectional view along the longitudinal axis of the cutter;

FIG. 3 shows an end view of the improved cutter with the rear plate removed therefrom; and FIG. 4 shows in plan view the cutter of FIG. 1.

As shown in FIG. 1, the cutter includes a frame or body housing 3 which is generally rectangular in exterior shape and which has a longitudinal bore 5 extending from the forward end 7 to the rearward end 9. It should be noticed that the bore is of larger diameter at the forward end than at the rearward, the two ends being joined, however, by the sloping common wall or shoulder 10 at approximately the longitudinal center of the housing. At the forward end of the housing is forward plate 19 which has circular threaded hole 11 therein of smaller radius than the bore, but in axial alignment therewith. A squib or other explosive cartridge means is threaded into the hole 11. The forward plate 19 is disposed over a recessed conventional O-ring 17 and is affixed to the housing 3 by a washer and allan-head lock nuts 13. The rear plate 15 is affixed to the rear of housing 3 in the same manner and completely encloses that end.

As shown in FIGS. 1 and 2, there is an aperture or eye 19 at the rear of the housing, extending through the bore walls perpendicular to the longitudinal axis. The parachute cable 20 extends through this aperture with one end connected to the control panels of the parachute and the other end to the control motor inside the load. The eye 19, which as shown in FIGS. 1 and 4 to be elongate in form, has both a forward 21 and a rearward 23 end, with the latter serving as the cutting base when severance occurs. The eye is elongated to allow for oscillating movement of the cable during payout or retraction.

A series of apertures extend outwardly from the bore. At the forward end is aperture 29 through which extends a shear pin 31 so designed to extend into the piston and to withhold movement of it in the bore and retain it adjacent the squib until the latter is fired. Approximately halfway down the axis of the bore's large end, and extending radially into the bore, is a first vent 33, the purpose of which is to vent pyrotechnic gases generated on explosion of the squib. The venting occurs after the cable has been severed and is therefore merely to relieve internal pressure in the large end of the bore. Disposed further down the bore toward the rear end plate, is a second vent 37 for venting compressed gas in front of the piston's sloped wall 39 as it moves down the bore. By placing the vents in front and behind the piston there is little, if any, velocity reduction in the piston's movement toward the cable. An annular impact washer 41 made of soft lead or other equivalent material, is set in the bore in abutting relation to the shoulder 10 for absorbing the kinetic energy of the moving piston.

With reference to FIGS. 3 and 4 there is shown a pair of bores or metering grooves 43, 45 disposed in axially parallel relation to the main bore 5 at 120° and 240° to the vertical. The grooves, which transfer a viscous grease or equivalent substance 46 (see FIG. 2) from the rear end of the bore to the surface of the piston adjacent the eye, are radially disposed near enough to the bore axis to provide a communicating slot or opening 47 of somewhat smaller dimension than the groove itself. The metering grooves extend from the rear plate 15 past the forward edge 21 of the eye, thus assuring transference of the grease completely over the piston's surface.

Extending outwardly from the metering grooves adjacent the forwardmost end thereof are smaller grooves or holes 51 for venting the grease after it has traversed the metering grooves 43, thus precluding excessive pressure buildup in the rear end of the cutter.

As previously explained, the entire cutter is affixed to the load as by a mounting plate 55, and is in proximate relation to the control motor (schematically shown in FIG. 1) which pays out and retracts the cable extending to the parachute control panel. Upon impact of the load with the water, an electrical signal closes a switch and fires the squib in the cutter's forward end 7. The pressure instantaneously overcomes the resisting force of pin 31, shearing it off and propelling the piston toward the cable at the rear of the housing. Although initial contact of the piston and cable may occur at the forward wall 21 of the eye 19, no shear action occurs until the cable is pushed to the rear wall 23, at which time shear occurs with the sheared piece of cable 57 being carried down the bore into the viscous grease (FIG. 1). Upon impact, the grease is forced into the metering grooves 43, 45 which transmit it to the forward end 21 of eye 19. When the grooves 43, 45 are completely filled, the grease, due to the piston's continued dynamic force, is pressured further into the bore 5 itself, encircling the piston 25 and thus filling any voids or passages in the bore around eye 19. It is, of course, recognized that the dimensions of the piston, bore, and piston travel are such as to allow impact of the piston with the grease before there is contact between the piston wall 39 and the impact washer 41. After contact, over-pressurization and kick back are prevented by the aforementioned small vents 51 which allow the viscous grease to escape when under high pressure.

It is apparent that various modifications and alterations to the instant invention may be made. For example, the metering grooves may be disposed in the piston itself rather than in the bore, and likewise the piston, bore, and cutter in general may assume different shapes and configurations. While the cutter is primarily intended for use in severing lines on parachutes, it is obviously useful in other applications where insulation is required upon severance of a transverse cable, rope, or similar means. Thus it should be recognized that such alterations and modifications are within both the spirit and scope of the instant disclosure and may be made without departing from the invention as defined by the appended claims.

That which is claimed is:

1. In an explosive line cutter:
   a barrel having a pair of holes disposed in the barrel bore and forming therewith a transverse eye to receive a line;
   a piston in the bore forward of the eye and adapted to be impelled rearward by an explosive charge;
   a viscous insulative substance in said bore rearward of the eye; and
   an end plate on the rear of the barrel closing the bore so that ignition of the explosive charge drives said piston into said substance thereby compressing it around said piston adjacent said transverse eye.

2. The explosive line cutter of claim 1 wherein said barrel bore has forward and rearward sections, said rearward section being of smaller cross section than said forward section and separated therefrom by a common shoulder, and said piston likewise has a forward and rearward section with said rearward section being of smaller cross section than said forward section with each said piston sections connected by a common wall so that the kinetic energy of said piston is absorbed in part by said bore common shoulder upon impact by said piston wall.

3. The explosive line cutter of claim 2 wherein an impact washer of relatively soft material is disposed in said bore against said common shoulder so as to further absorb kinetic energy of said moving piston.

4. In an explosive line cutter;
   a barrel having a pair of holes forming with the barrel bore a transverse eye to receive a line;
   a piston in the bore forward of the eye and adapted to be impelled rearward to sever the line;
   an explosive element forward of the piston;
   a viscous insulative substance in said bore rearward of the eye; and
   an end plate on the rear of the barrel closing said bore so that ignition of said explosive element drives said piston into said substance, thereby compressing it around said piston adjacent said transverse eye.

5. The explosive line cutter of claim 4 wherein said explosive element is a squib fixedly disposed in said forward end plate.

6. The structure of claim 1 wherein said explosive line cutter has means therein to facilitate movement of said viscous substance along the bore to the eye upon impact of the substance by the piston.

7. The structure of claim 6 wherein said means includes a channel proximate said eye and in communicative relation with said viscous substance.

8. The explosive line cutter of claim 4 wherein said barrel bore contains channel means therein proximate said eye and in communicative relation with said viscous insulative substance.

9. The explosive line cutter of claim 2 wherein said barrel bore rearward section has channel means therein proximate said eye and in communicative relation with said viscous substance.

10. The structure of claim 8 wherein said channel means are disposed parallel to the longitudinal axis of said bore.

11. The explosive line cutter recited in claim 2 wherein a first gas vent is disposed in said forward bore rearward of said piston; and
    a second gas vent is disposed in said forward bore forward of said piston.

12. The explosive line cutter of claim 2 wherein said barrel bore rearward section has metering grooves therein forward of said eye for alleviating excessive pressure buildup by said viscous substance upon impact by said piston.

13. The explosive line cutter of claim 4 wherein said barrel bore has metering grooves proximate said eye but forward thereof, for relieving excessive pressure buildup by said viscous substance upon impact by said piston.

14. The structure of claim 13 wherein said explosive cutter has channel means therein to facilitate movement of said viscous substance along the bore toward the eye upon impact of the substance by the piston.

References Cited by the Examiner

UNITED STATES PATENTS

| | | | |
|---|---|---|---|
| 3,003,235 | 10/1961 | Temple et al. | 30—180 |
| 3,267,573 | 8/1966 | Hill | 30—228 |

References Cited by the Applicant

UNITED STATES PATENTS

| | | |
|---|---|---|
| 2,581,645 | 1/1952 | Frieder et al. |
| 2,755,550 | 7/1956 | Benjamin. |
| 2,924,147 | 2/1960 | Bohl et al. |
| 2,926,565 | 3/1960 | Thorness. |

WILLIAM FELDMAN, *Primary Examiner.*

JIMMY C. PETERS, *Assistant Examiner.*